Nov. 20, 1923.  1,474,862
H. TOLBERT
MOLDING MACHINE
Filed Oct. 24, 1922  2 Sheets-Sheet 1
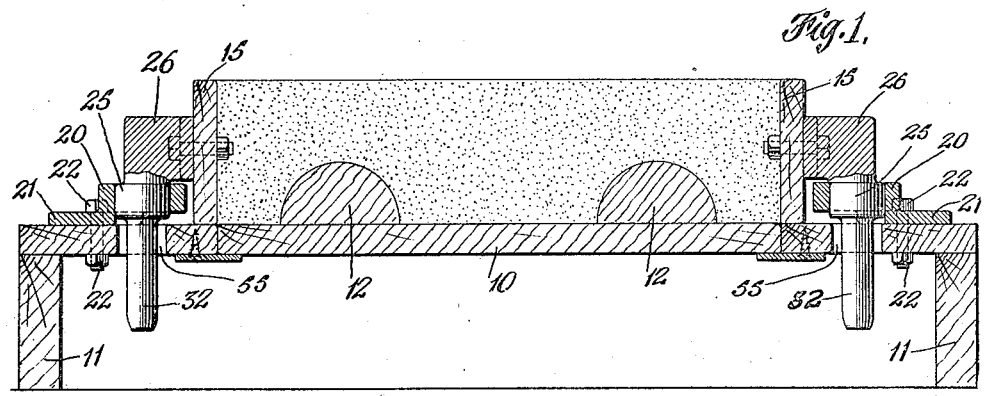
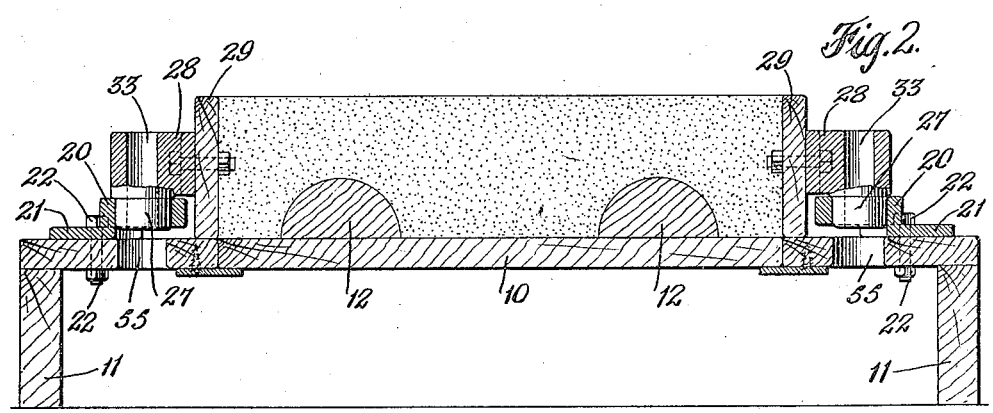
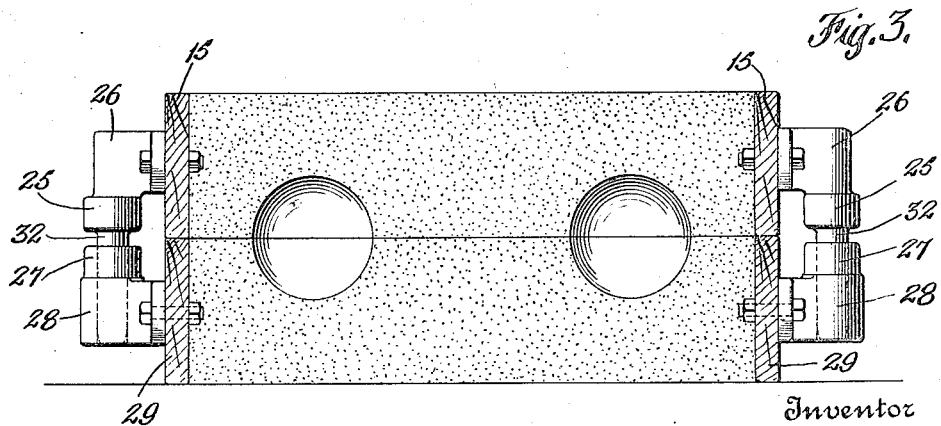
Inventor
Herbert Tolbert
By his Attorney Nov. 20, 1923.
H. TOLBERT
1,474,862
MOLDING MACHINE
Filed Oct. 24, 1922  2 Sheets-Sheet 2
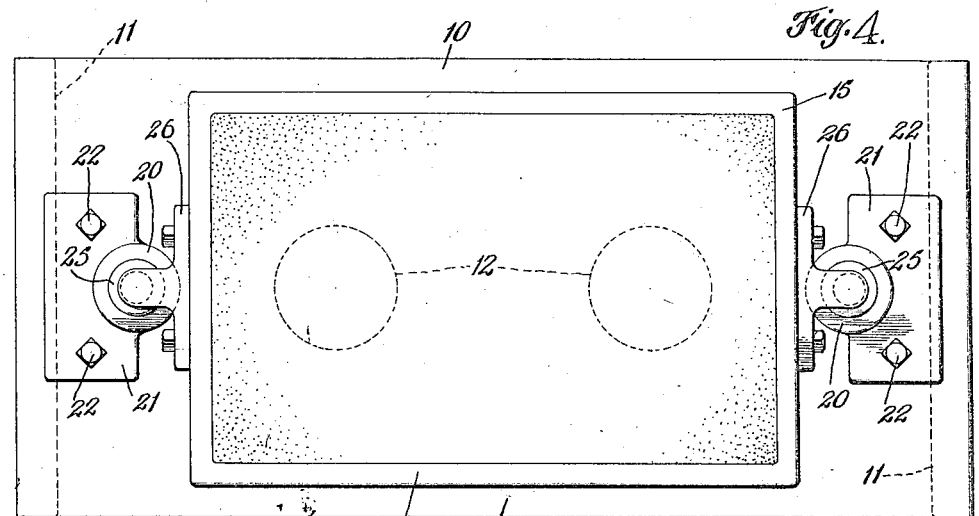
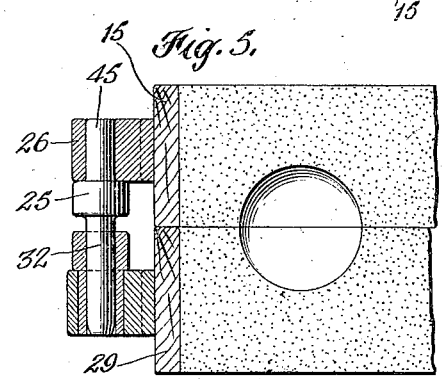
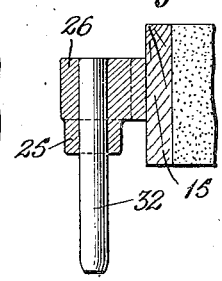
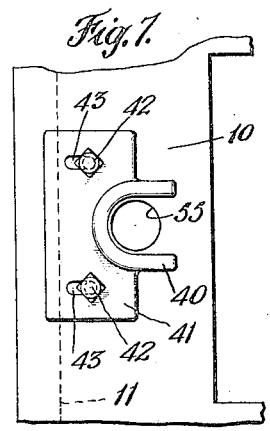
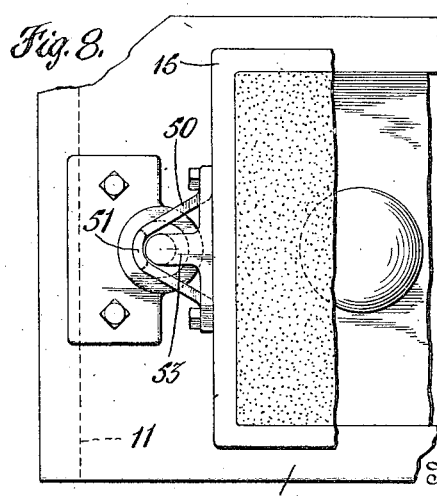
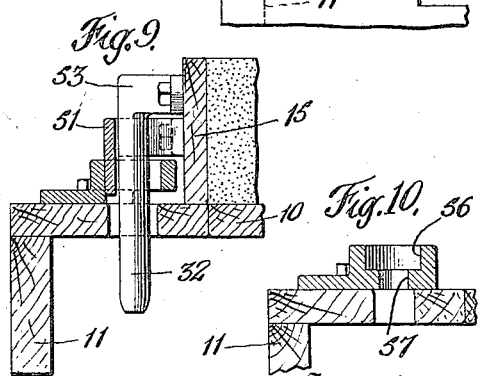
Inventor
By his Attorney Patented Nov. 20, 1923.

1,474,862

UNITED STATES PATENT OFFICE.

HERBERT TOLBERT, OF BELLE HARBOR, NEW YORK.

MOLDING MACHINE.

Application filed October 24, 1922. Serial No. 596,611.

*To all whom it may concern:*

Be it known that I, HERBERT TOLBERT, citizen of the United States, and resident of Belle Harbor, in the county of Queens and State of New York, have invented certain new and useful Improvements in Molding Machines; and I do hereby declare the following to be a full, clear, and exact description of the invention, such as will enable others skilled in the art to which it appertains to make and use the same.

This invention relates to molding machines of the type wherein the mold is formed partly within the cope portion of the flask and partly within the drag portion. It is understood that each portion of the flask is in turn placed over the pattern supported upon a mold plate or board and is then filled and rammed.

This invention has for its main object the provision of improved means whereby each portion of the flask is supported upon the mold plate in predetermined relation thereto, and means whereby said flask portions, when subsequently brought together, are supported in predetermined relation to each other.

It is a further object of the invention to provide novel and efficient means upon said mold plate and upon the flask portions whereby rapid and accurate positioning of the parts as described above may be obtained.

A further object of the invention is the provision of shanks carried by each flask portion and sockets upon the mold plate capable of coacting with the shanks of both flask portions in succession to position said portions upon the mold plate in predetermined position.

A further object is the provision of sockets upon the mold plate as described above capable of adjustment to vary the positions of the flask portions thereon and also to cooperate with flask portions of different dimensions.

Other objects and advantages will be in part obvious and in part specifically pointed out in the specification which follows:

In the accompanying drawings,

Fig. 1 is a vertical section through a cope portion of a flask in position upon a mold plate.

Fig. 2 is a vertical section through a drag portion of a flask in position upon said mold plate.

Fig. 3 is a vertical section through the complete flask ready for pouring the mold.

Fig. 4 is a plan view of the device shown in Fig. 1.

Fig. 5 is a vertical section through a flask showing a modified construction of interlocking members between the cope and the drag.

Fig. 6 is a vertical section showing another modified construction of drag locking member.

Fig. 7 is a plan view of a modified form of positioning member on the mold plate.

Fig. 8 is a plan view of another modified form of locking members on the flask portions.

Fig. 9 is a vertical section of the device shown in Fig. 8.

Fig. 10 is a vertical section through another modified form of positioning member on the mold plate.

In these drawings, there is shown a molding machine comprising a mold plate 10 elevated upon supports 11 and upon which portions 12 of a pattern are placed in predetermined positions. The cope 15 and the drag 29 of a flask are adapted to be placed in turn over the patterns upon the mold plate and then filled with suitable material, such as sand, and rammed in the usual manner.

As hereinbefore stated, the patterns are set in predetermined positions upon the mold plate, and unless the cope and drag are accurately set in predetermined position upon the mold plate, the mold will be imperfect when the cope and drag are brought together. To set each portion of the flask in predetermined position upon the mold plate the latter may be provided with sockets 20, each forming part of a bracket 21 fixed to the mold plate in any suitable manner, as by bolts 22. Preferably the sockets 20 are elevated above the mold plate as shown. Cooperating with the sockets 20 are shanks 25 forming part of brackets 26 fixed to the cope, and shanks 27 forming part of brackets 28 fixed to the drag. The peripheries of the shanks 25 and 27 are of course the same and are adapted to fit in the sockets 20. It will be obvious, therefore, that the fixed position of the sockets 20 fixes and predetermines the position of the cope and the drag so that each of such flask portions occupies the same position with respect to the mold plate and the patterns.

It is then necessary to bring the flask portions together in such manner that the axes of the shanks 25 and 27 are in alignment. Since each flask portion is previously positioned with respect to the mold plate and the pattern thereon, the alignment of the axes of the shanks 25 and 27 will insure a perfect mold. For this purpose each shank 25 of the cope is provided with an extension or shank 32 of smaller diameter adapted to fit in a tubular bore 33 extending through each shank 27 of the drag. When the cope and drag are brought together in the usual manner, as shown in Fig. 3, the portions of the mold in the respective flask portions will be caused to register. It will be understood that the locking members described as being carried by the cope and drag may, if desired, be interchanged and carried by the drag and cope, respectively.

Referring to Fig. 7, there is shown a bracket 41 in place of the bracket 21 and having a U-shaped socket 40 in place of the circular socket 20. This bracket is fastened to the mold plate by bolts 42 passing through elongated slots 43 in the bracket so that the latter may be adjusted laterally to vary the distance between the brackets on the mold plate, and to vary the position of the flask portions on said plate. The U shape of the socket 40 permits adjustment of the socket while the respective shank is in position and also permits easy positioning of the shanks therein; but it will be understood that the sockets 20 may be similarly adjusted by other mechanism, if desired.

Various modifications may be resorted to in constructing the double shanks 25, 32. Thus, in Fig. 5, the double shank is not formed integral with the bracket 26 but is provided with an extension 45 set into the bracket. In Fig. 6 the shank 25 is shown formed integral with the brackets 26, but the shank 32 is separate and extends through said shank 25 and the bracket. In Figs. 8 and 9 the shank of large diameter forms part of a bracket 50 fastened to the cope and is in the form of an arcuate segment 51. In this case the shank 32 of small diameter also forms part of a bracket 53 separate and independent from the bracket 50, the shank 32 extending downwardly within the bracket 50.

The mold plate is provided with an opening 55 through which the shank 32 extends when the shank 25 of larger diameter is seated in the socket 20, as shown in Fig. 1. It may be desirable to guide said shank 32 and support it at the same time that shank 25 is positioned in the socket 20. For this purpose there may be provided a double socket 56, 57 of large and small diameters, respectively, to receive the shanks 25 and 32, respectively.

The above description illustrates the principles embodied in my invention, but it will be understood that various changes and modifications may be made within the scope of the invention as defined in the annexed claims.

What I claim is:—

1. In a molding machine comprising a mold plate having sockets and a flask consisting of cope and drag portions, each of said flask portions having shanks engageable in said sockets to position said portions in predetermined relation to said plate, the shank of one of said portions having a tubular bore therethrough and the other of said portions having a second shank adapted to cooperate with said bore to align said portions.

2. In a molding machine comprising a mold plate and a flask, the latter consisting of cope and drag portions, members on said mold plate having sockets, and each of said flask portions having shanks engageable in said sockets to position said portions in predetermined relation to said plate, the shank of one of said portions having a tubular bore therethrough and the other of said portions having a second shank adapted to cooperate with said bore to align said portions.

3. In a molding machine comprising a mold plate and a flask, the latter consisting of cope and drag portions, members on said mold plate having sockets, and each of said flask portions having shanks engageable in said sockets to position said portions in predetermined relation to said plate, the shank of one of said portions having a tubular bore therethrough, the other of said portions having a second shank forming an extension of the first shank thereon and having the same longitudinal axis, said second shank being adapted to cooperate with said bore to align said portions.

4. In a molding machine comprising a mold plate and a flask, the latter consisting of cope and drag portions, members on said mold plate having sockets, and each of said flask portions having shanks engageable in said sockets to position said portions in predetermined relation to said plate, the shank of said drag portion having a tubular bore therethrough, and the shank of said cope portion having an extension forming a shank of smaller diameter and adapted to cooperate with said bore to align said portions.

5. In a molding machine comprising a mold plate and a flask, the latter consisting of cope and drag portions, members on said mold plate having sockets, and each of said flask portions having shanks engageable in said sockets to position said portions in predetermined relation to said plate, the shank of said drag portion having a tubular bore therethrough, and the shank of said cope portion having an extension forming a shank of smaller diameter and adapted to cooperate with said bore to align said portions, said shanks of said cope portions being formed integral.

6. In a molding machine comprising a mold plate and a flask, the latter consisting of cope and drag portions, members on said mold plate having U-shaped sockets, each of said flask portions having shanks engageable in the bends of said sockets to position said portions in predetermined relation to said plate.

7. In a molding machine comprising a mold plate and a flask, the latter consisting of cope and drag portions, members on said mold plate having U-shaped sockets, each of said flask portions having shanks engageable in the bends of said sockets to position said portions in predetermined relation to said plate, said sockets being oppositely positioned, and means whereby said sockets may be adjusted to vary the positioning of said portions.

8. In a molding machine comprising a mold plate and a flask, the latter consisting of cope and drag portions, members on said mold plate having sockets, and each of said flask portions having shanks engageable in said sockets to position said portions in predetermined relation to said plate, the shank of said drag portion having a tubular bore therethrough, and the shank of said cope portion having an extension forming a shank of smaller diameter and adapted to cooperate with said bore to align said portions, said shanks of said cope portion being formed integral, and said mold plate having an opening therethrough so that said smaller shank may extend through said opening when said larger shank is seated in the socket.

9. In a molding machine comprising a mold plate and a flask consisting of cope and drag portions, members on said mold plate having sockets, one of said flask portions having shanks engageable in said sockets, and the other of said flask portions having double shanks of large and small diameter, the shanks of large diameter being engageable in said sockets, the shanks of said first portion each having a bore therethrough and said shanks of smaller diameter extending through said bores.

In testimony whereof I affix my signature.

HERBERT TOLBERT.